US012620628B2

(12) United States Patent
Ma et al.

(10) Patent No.: US 12,620,628 B2
(45) Date of Patent: May 5, 2026

(54) ALCOHOL-BASED ELECTROLYTES FOR HIGHLY REVERSIBLE Zn METAL BATTERIES

(71) Applicant: U.S. Army DEVCOM, Army Research Laboratory, Adelphi, MD (US)

(72) Inventors: Lin Ma, Silver Spring, MD (US); Marshall A. Schroeder, Pasadena, MD (US); Oleg A. Borodin, Laurel, MD (US); Travis P. Pollard, Rockville, MD (US); Michael S. Ding, Potomac, MD (US); Kang Xu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 276 days.

(21) Appl. No.: 17/528,719

(22) Filed: Nov. 17, 2021

(65) Prior Publication Data

US 2023/0155179 A1    May 18, 2023

(51) Int. Cl.
*H01M 10/0569* (2010.01)
*H01M 4/42* (2006.01)
(Continued)

(52) U.S. Cl.
CPC ......... *H01M 10/0569* (2013.01); *H01M 4/42* (2013.01); *H01M 4/463* (2013.01);
(Continued)

(58) Field of Classification Search
CPC ..... H01M 4/244; H01M 4/42; H01M 10/0569
See application file for complete search history.

(56) References Cited

U.S. PATENT DOCUMENTS 6,743,947 B1    6/2004  Xu et al.
6,905,762 B1    6/2005  Jow et al.
(Continued)

FOREIGN PATENT DOCUMENTS

CN        105762406 A  *  7/2016  ........ H01M 10/0567

OTHER PUBLICATIONS

Wang, N., et al., "Stabilized rechargeable aqueous zinc batteries using ethylene glycol as water blocker," ChemSusChem 2020, vol. 13, Issue 20, Oct. 21, 2020, pp. 5556-5564.
(Continued)

*Primary Examiner* — Stephan J Essex
(74) *Attorney, Agent, or Firm* — Emily C. Moscati

(57)        ABSTRACT

An electrochemical cell includes a negative electrode including a metal, metal alloy, or an electrode active material that reversibly intercalates and de-intercalates cations; a positive electrode including (i) an electrode active material that reversibly intercalates and de-intercalates cations or anions, or (ii) an inert host that reversibly catalyzes an external reactant; a separator between the negative electrode and the positive electrode; and an electrolyte including one or more alcohol-based solvents, with one or more salts. The solvents may include methanol, ethanol, isopropanol, tri-glycerol, 2,2,2-trifluoroethanol, an organic small molecule or macromolecule that contain at least one hydroxyl (OH) group, or a combination thereof. The electrochemical cell may include a mixture of multiple alcohol-based solvents or a mixture of the one or more alcohol-based solvents with water, mixed at select ratios. The electrochemical cell may include one or more additives having a concentration range between 0.01% to 20% by weight.

11 Claims, 8 Drawing Sheets

(51) Int. Cl.

| | | |
|---|---|---|
| *H01M 4/46* | (2006.01) | |
| *H01M 10/0567* | (2010.01) | |
| *H01M 50/417* | (2021.01) | |
| *H01M 50/437* | (2021.01) | |

(52) U.S. Cl.
CPC ....... *H01M 4/466* (2013.01); *H01M 10/0567* (2013.01); *H01M 50/417* (2021.01); *H01M 50/437* (2021.01); *H01M 2300/0042* (2013.01)

(56) References Cited

U.S. PATENT DOCUMENTS

| | | | |
|---|---|---|---|
| 6,924,061 | B1 | 8/2005 | Jow et al. |
| 6,939,647 | B1 | 9/2005 | Jow et al. |
| 7,172,834 | B1 | 2/2007 | Jow et al. |
| 7,442,471 | B1 | 10/2008 | Jow et al. |
| 7,524,579 | B1 | 4/2009 | Jow et al. |
| 7,582,380 | B1 | 9/2009 | Dunstan et al. |
| 7,824,802 | B2 | 11/2010 | Zhang et al. |
| 7,833,660 | B1 | 11/2010 | Zhang et al. |
| 8,632,918 | B2 | 1/2014 | Xu et al. |
| 8,795,904 | B2 | 8/2014 | Xu |
| 10,438,753 | B2 | 10/2019 | Xu et al. |
| 10,892,486 | B2 | 1/2021 | Yushin et al. |
| 11,038,197 | B2 | 6/2021 | Xu et al. |
| 2002/0086213 | A1 | 7/2002 | Utsugi et al. |
| 2010/0015514 | A1 | 1/2010 | Miyagi et al. |
| 2015/0364789 | A1* | 12/2015 | Ogawa ................. H01M 4/366 429/321 |
| 2017/0104363 | A1 | 4/2017 | Mukherjee et al. |
| 2021/0028500 | A1* | 1/2021 | Pan ...................... H01M 10/36 |

OTHER PUBLICATIONS

Chang, N., et al., "An aqueous hybrid electrolyte for low-temperature zinc-based energy storage devices," Energy Environ. Sci., 2020, vol. 13, Issue 10, Aug. 12, 2020, pp. 3527-3535.

Hosseini, S., et al., "Ethanol as an electrolyte additive for alkaline zinc-air flow batteries," Scientific Reports, vol. 8, Jul. 26, 2018, pp. 11273-11283.

* cited by examiner

<u>FIG. 7</u>

ALCOHOL-BASED ELECTROLYTES FOR HIGHLY REVERSIBLE Zn METAL BATTERIES

GOVERNMENT INTEREST

The embodiments herein may be manufactured, used, and/or licensed by or for the United States Government without the payment of royalties thereon.

BACKGROUND

Technical Field

The embodiments herein generally relate to electrolytes for metal batteries, and more particularly to alcohol-based electrolytes.

Description of the Related Art

Water-based electrolytes are the most studied platform for zinc metal batteries. Despite years of research attempting to optimize these systems for rechargeable zinc batteries, aqueous systems are still plagued with issues like hydrogen evolution and dendrite growth which limit capacity retention and cycle life. Other classes of non-aqueous solvents have also been considered, such as nitriles (acetonitrile), alkyl phosphates (trimethylphosphate), and imides (urea), but each of these systems still face efficiency barriers preventing commercialization. Solvent-free compositions such as deep eutectic salts have also been investigated but are generally costly and tend to have a limited temperature window of operation.

Most electrolytes for Zn metal batteries suffer from electrolyte/metal anode parasitic reactions, which reduce the efficiency of the battery. Even optimized aqueous/non-aqueous electrolyte formations are not capable of cycling Zn metal anode at reasonable areal capacities ($>1$ mAh cm$^2$) and current densities ($>0.25$ mA/cm$^2$) with high efficiency ($>95\%$). For rechargeable batteries with a Zn metal anode to become commercially viable, electrolytes with significantly higher efficiencies must be developed.

SUMMARY

In view of the foregoing, the embodiments herein provide an electrochemical cell comprising a negative electrode comprising a metal, metal alloy, or an electrode active material that reversibly intercalates and de-intercalates cations; a positive electrode comprising (i) an electrode active material that reversibly intercalates and de-intercalates cations or anions, or (ii) an inert host that reversibly catalyzes an external reactant; a separator between the negative electrode and the positive electrode; and an electrolyte comprising one or more alcohol-based solvents, with one or more salts. The one or more alcohol-based solvents may comprise methanol, ethanol, isopropanol, triglycerol, 2,2,2-trifluoroethanol, an organic small molecule or macromolecule that contain at least one hydroxyl (OH) group, or a combination thereof. The electrochemical cell may comprise a mixture of multiple alcohol-based solvents mixed at select ratios. The electrochemical cell may comprise a mixture of the one or more alcohol-based solvents with water at select ratios. The electrochemical cell may comprise one or more additives comprising a concentration range between 0.01% to 20% by weight.

The one or more salts may comprise a zinc salt. The zinc salt may comprise any of a zinc cation and an inorganic or organic anion. The zinc salt may comprise zinc trifluoromethanesulfonate, zinc bis(trifluoromethane)sulfonimide, zinc chloride, zinc sulfate, zinc nitrate, zinc bromide, zinc fluoride, zinc perchlorate or zinc acetate, or a combination thereof at select ratios. The cations may comprise any of $Zn^{2+}$, $Mg^{2+}$, $Ca^{2+}$, $H^+$, and $Al^{3+}$. The anions may comprise any of trifluoromethanesulfonate ($OTF^-$), bis(trifluoromethane)sulfonamide ($TFSI^-$), chloride ($Cl^-$), sulfate ($SO_4^{2-}$), nitrate ($NO_3^-$), bromide ($Br^-$), fluoride ($F^-$), perchlorate ($ClO_4^-$), and acetate ($C_2H_3O_2^-$).

The separator may comprise a porous polyolefin material. The separator may comprise a glass microfiber material. The separator may comprise a polymer material that is gellable with the electrolyte. The separator may comprise a ceramic solid electrolyte material. The separator may comprise a glass solid electrolyte material. The one or more salts may be dissolved in a concentration range between 0.1M to 4M.

Another embodiment provides a zinc metal battery comprising a negative electrode comprising a metal, metal alloy, or an electrode active material that reversibly plates and strips cations, wherein the cations comprise any of $Zn^{2+}$, $Mg^{2+}$, $Ca^{2+}$, $Al^{3+}$; a positive electrode comprising an electrode active material that reversibly intercalates or de-intercalates cations or anions, wherein the cations comprise any of $Zn^{2+}$, $Mg^{2+}$, $Ca^{2+}$, $Al^{3+}$, and $H^+$, and wherein the anions comprise any of trifluoromethanesulfonate ($OTF^-$), bis(trifluoromethane)sulfonamide ($TFSI^-$), chloride ($Cl^-$), sulfate ($SO_4^{2-}$), nitrate ($NO_3^-$), bromide ($Br^-$), fluoride ($F^-$), perchlorate ($ClO_4^-$), and acetate ($C_2H_3O_2^-$); a separator between the negative electrode and the positive electrode; and an aqueous or non-aqueous electrolyte comprising one or more alcohol-based solvents, with one or more zinc salts over a concentration range between 0.1M to 4M.

The one or more alcohol-based solvents may comprise methanol, ethanol, isopropanol, triglycerol, 2,2,2-trifluoroethanol, or a combination thereof. The one or more zinc salts may comprise any of zinc trifluoromethanesulfonate, zinc bis(trifluoromethane)sulfonimide, zinc chloride, zinc sulfate, zinc nitrate, zinc bromide, zinc fluoride, zinc perchlorate, and zinc acetate. The zinc metal battery may comprise one or more additives comprising a concentration range between 0.01% to 20% by weight.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
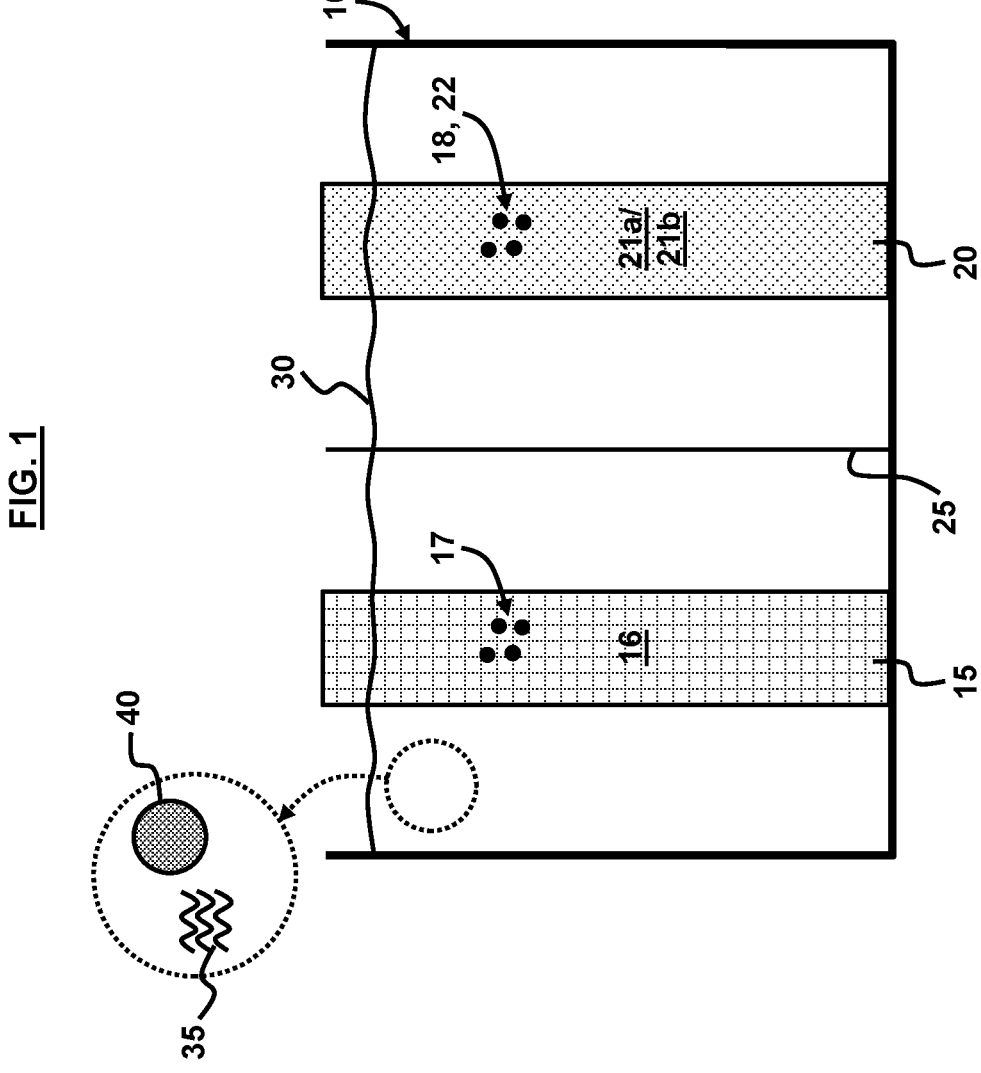
FIG. 1 is a schematic diagram illustrating an electrochemical cell, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide novel alcohol-based electrolytes designed to support rechargeable zinc metal batteries. In terms of the previous use of alcohols for rechargeable zinc metal batteries, ethylene glycol was suggested as a co-solvent with water to improve cycling stability of Zn metal at low temperature, but an approach involving pure alcohol-based electrolytes and the associated enhancement in cycling reversibility has never been demonstrated. Accordingly pure alcohols (e.g., methanol, ethanol, etc.) have not been previously considered as a standalone solvent chemistry for this battery technology, but have demonstrated utility according to the embodiments herein by addressing many limitations of current electrolytes for Zn metal including improved Zn anode cycling efficiency and suppression of Zn dendrites formation/growth. This approach leverages solvents (alcohols) which are widely available, low cost, and could represent a critical breakthrough toward commercialization of rechargeable Zn metal batteries. Referring now to the drawings, and more particularly to FIGS. 1 through 8, where similar reference characters denote corresponding features consistently throughout the figures, there are shown preferred embodiments. In the drawings, the size and relative sizes of components, layers, and regions, etc. may be exaggerated for clarity.

FIG. 1 illustrates an electrochemical cell 10 comprising a negative electrode 15 comprising a metal, metal alloy, or an electrode active material 16 that reversibly intercalates (plates) and de-intercalates (strips) cations 17. In some examples, the metal, metal alloy, or the electrode active material 16 may comprise Zn, Mg, Ca, or Al, among others. In some examples, the cations 17 may comprise, but are not limited to, any of Zn$^{2+}$, Mg$^{2+}$, Ca$^{2+}$, H$^+$, and Al$^{3+}$. The electrochemical cell 10 comprises a positive electrode 20 comprising (i) an electrode active material 21$a$ that reversibly intercalates (plates) and de-intercalates (strips) cations 18 or anions 22, or (ii) an inert host 21$b$ that reversibly catalyzes an external reactant. In some examples, the electrode active material 21$a$ may comprise MnO$_2$, V$_2$O$_5$, or polyaniline, among others. According to an example, the inert host 21$b$ may comprise oxygen (e.g., supplied by a storage tank (not shown) or from the ambient atmosphere). The electrochemical cell 10, negative electrode 15, and positive electrode 20 may comprise any suitable sizes, shapes, and configurations. In an example, the electrochemical cell 10 may be a galvanic cell. In some examples, the anions 22 may comprise, but are not limited to, any of trifluoromethanesulfonate (OTF$^-$), bis(trifluoromethane) sulfonamide (TFSI$^-$), chloride (Cl$^-$), sulfate (SO$_4$$^{2-}$), nitrate (NO$_3$$^-$), bromide (Br$^-$), fluoride (F$^-$), perchlorate (ClO$_4$$^-$), and acetate (C$_2$H$_3$O$_2$$^-$). The electrochemical cell 10 comprises a separator 25 between the negative electrode 15 and the positive electrode 20. As further described below, the separator 25 may comprise any suitable size, shape, and configuration. The electrochemical cell 10 further comprises an electrolyte 30 comprising one or more alcohol-based solvents 35, with one or more salts 40.

In an example, the one or more alcohol-based solvents 35 may comprise, but are not limited to, methanol, ethanol, isopropanol, triglycerol, 2,2,2-trifluoroethanol, an organic small molecule or macromolecule that contain at least one hydroxyl (OH) group, or a combination thereof. In an example, the one or more salts 40 may be dissolved preferably in a concentration range between 0.1M to 4M. However, other concentration ranges may be used in accordance with the embodiments herein.

Figure 2:
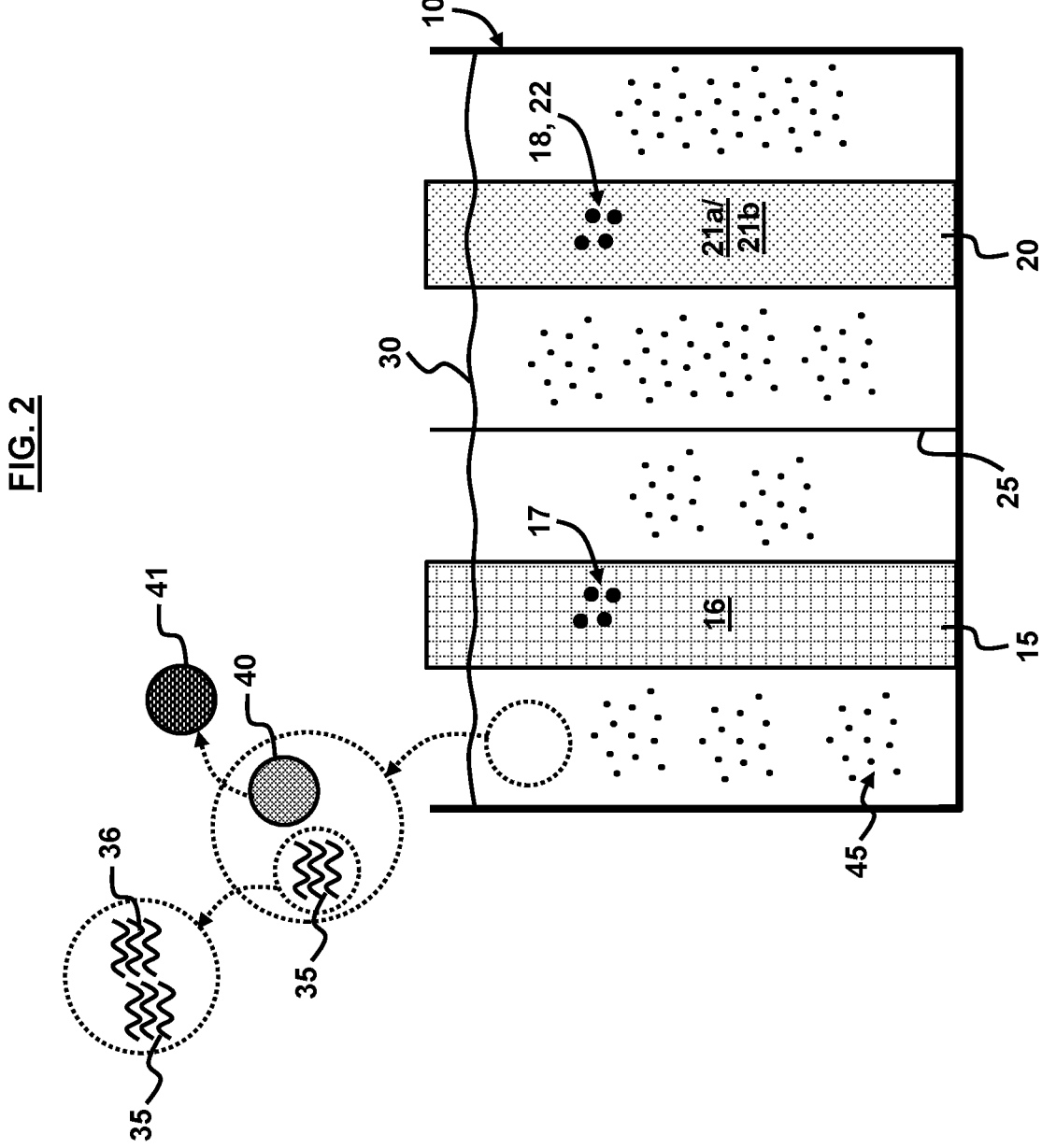
FIG. 2 is a schematic diagram illustrating the electrochemical cell of FIG. 1 with other mixtures and additives, according to some embodiments herein.

According to an example, the electrochemical cell 10 may comprise a mixture of multiple alcohol-based solvents 35 mixed at select ratios. Some example ratios include a mixture of multiple solvents 35 at ratios of 10:90, 30:70, or 50:50 by weight. As shown in FIG. 2, with reference to FIG. 1, the electrochemical cell 10 may comprise a mixture of the one or more alcohol-based solvents 35 with water 36 at select ratios. Some example ratios include a mixture of the one or more solvents 35 with water 36 at ratios of 10:90, 30:70, or 50:50 by weight. The electrochemical cell 10 may comprise one or more additives 45 comprising a concentration range between 0.01% to 20% by weight. Some example additives 45 that may be used include triethyl phosphate or trimethyl phosphate. In an example, the one or more salts 40 may comprise a zinc salt 41. Moreover, the zinc salt 41 may comprise any of a zinc cation and an inorganic or organic anion, according to some examples. Furthermore, the zinc salt 41 may comprise, but are not limited to, zinc trifluoromethanesulfonate, zinc bis(trifluoromethane)sulfonimide, zinc chloride, zinc sulfate, zinc nitrate, zinc bromide, zinc fluoride, zinc perchlorate or zinc acetate, or a combination thereof at select ratios, according to some other examples.

Figure 3:
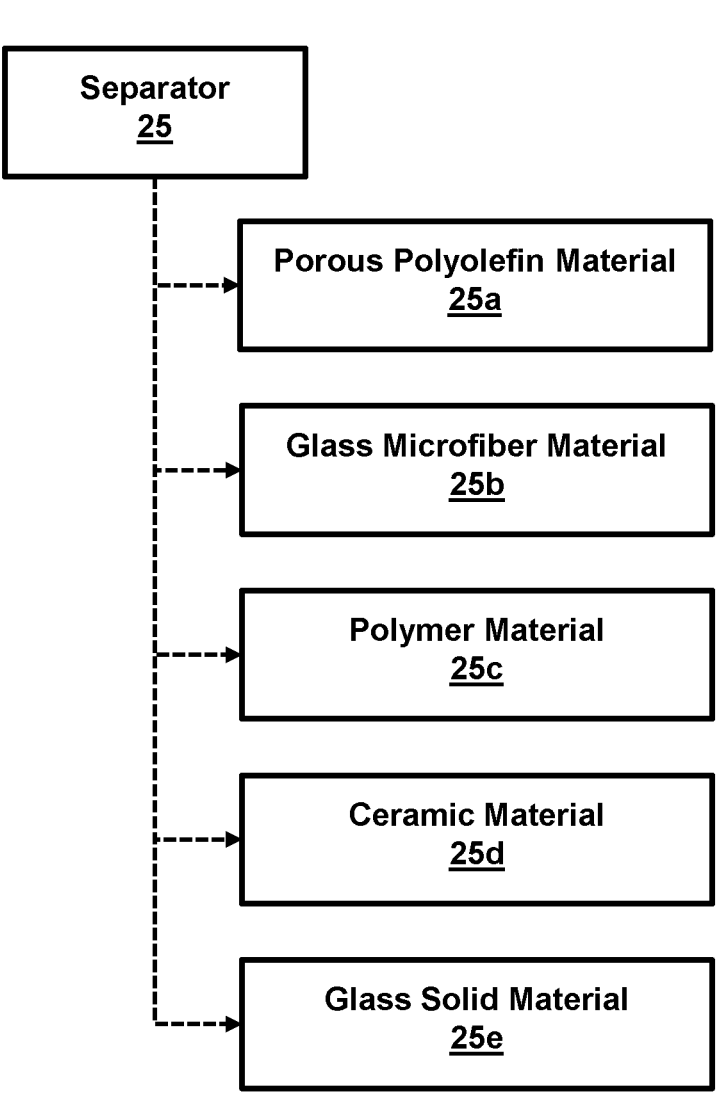
FIG. 3 is a block diagram illustrating various types of separators used in the electrochemical cell of FIG. 1, according to some embodiments herein.

In various examples, as shown in FIG. 3, with reference to FIGS. 1 and 2, the separator 25 may comprise, but is not limited to, a porous polyolefin material 25$a$, a glass microfiber material 25$b$, a polymer material 25$c$ that is gellable with the electrolyte 30, a ceramic solid electrolyte material 25$d$, or a glass solid electrolyte material 25$e$, among other types of separators. According to an example, the separator

25 may comprise any solid material that is insulating to electrons but allows ions to conduct.

The electrochemical cell 10 provided by the embodiments herein overcome the problem of low cycling efficiency of Zn metal anode, slow kinetics of unfavorable interphases formed by the reduction of electrolytes on Zn metal anode surfaces or other deleterious electrode/electrolyte interactions in MV metal batteries. The electrochemical cell 10 is also capable of suppressing dendrite growth, which addresses a huge safety concern in these systems. Moreover, the electrochemical cell 10 also avoids $H_2$ evolution, which is a common problem in rechargeable water-based electrolytes.

Figure 4:
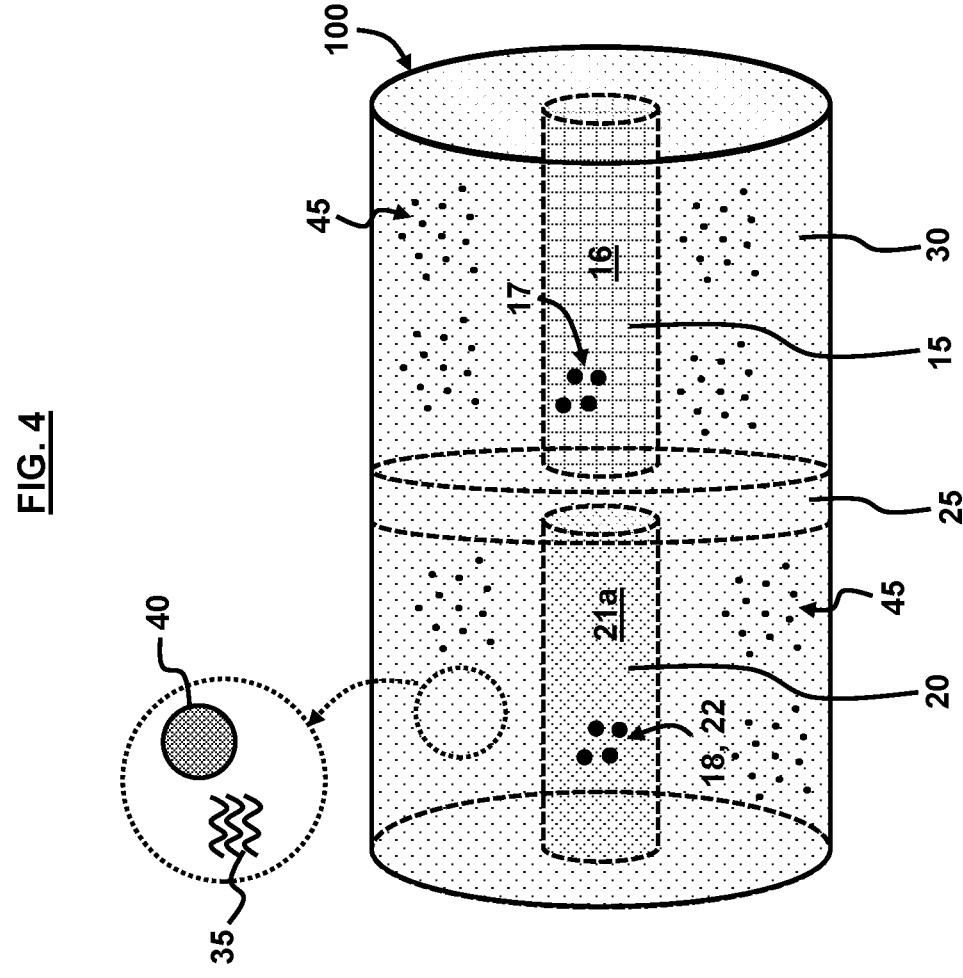
FIG. 4 is a schematic diagram illustrating a zinc metal battery, according to an embodiment herein.

FIG. 4, with reference to FIGS. 1 through 3, illustrates a zinc metal battery 100 comprising a negative electrode 15 comprising a metal, metal alloy, or an electrode active material 16 that reversibly plates and strips cations 17. The cations 17 comprise, but are not limited to, any of $Zn^{2+}$, $Mg^{2+}$, $Ca^{2+}$, $Al^{3+}$, according to some examples. The zinc metal battery 100 may be a rechargeable or non-rechargeable battery, according to some examples. The zinc metal battery 100 comprises a positive electrode 20 comprising an electrode active material 21a that reversibly intercalates or de-intercalates cations 18 or anions 22. In some examples, the cations 18 comprise, but are not limited to, any of $Zn^{2+}$, $Mg^{2+}$, $Ca^{2+}$, $Al^{3+}$, and $H^+$. In some examples, the anions comprise, but are not limited to, any of trifluoromethanesulfonate (OTF⁻), bis(trifluoromethane)sulfonamide (TFSI⁻), chloride (Cl⁻), sulfate ($SO_4^{2-}$), nitrate ($NO_3^-$), bromide (Br⁻), fluoride (F⁻), perchlorate ($ClO_4^-$), and acetate ($C_2H_3O_2^-$). The zinc metal battery 100 comprises a separator 25 between the negative electrode 15 and the positive electrode 20. The zinc metal battery 100 comprises an aqueous or non-aqueous electrolyte 30 comprising one or more alcohol-based solvents 35, with one or more zinc salts 40 over a preferable concentration range between 0.1M to 4M. However, other concentration ranges may be used in accordance with the embodiments herein.

In some examples, the one or more alcohol-based solvents 35 may comprise, but are not limited to, methanol, ethanol, isopropanol, triglycerol, 2,2,2-trifluoroethanol, or a combination thereof. According to some examples, the one or more zinc salts 40 may comprise, but are not limited to, any of zinc trifluoromethanesulfonate, zinc bis(trifluoromethane)sulfonimide, zinc chloride, zinc sulfate, zinc nitrate, zinc bromide, zinc fluoride, zinc perchlorate, and zinc acetate. Additionally, the zinc metal battery 100 may comprise one or more additives 45 comprising a concentration range between 0.01% to 20% by weight, according to some examples.

Figure 5:
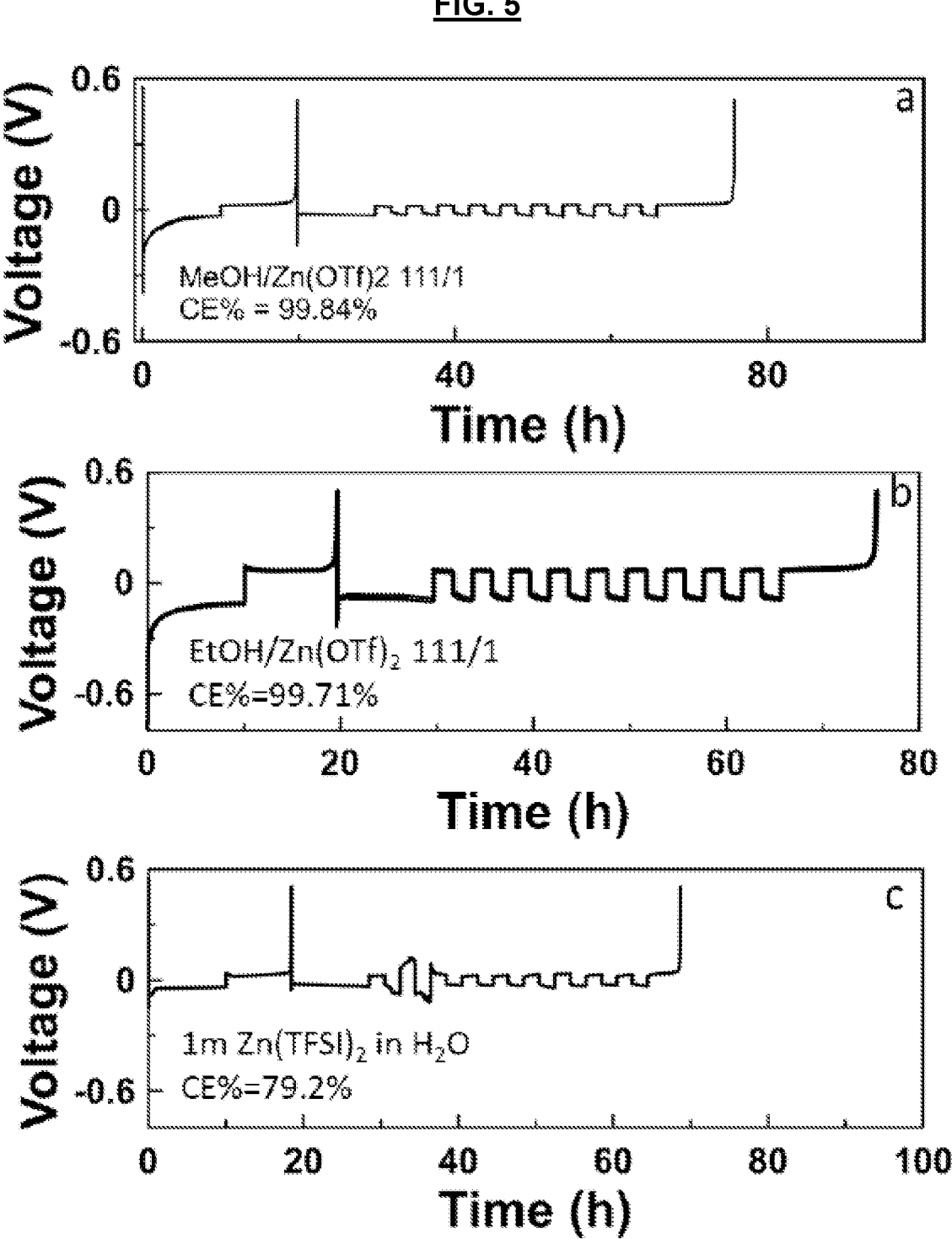
FIG. 5 are graphical diagrams illustrating test results comparing (a) methanol-based, (b) ethanol-based, and (c) conventional aqueous zinc electrolytes, according to the embodiments herein.

FIG. 5, with reference to FIGS. 1 through 4, illustrates initial test results, which shows (a) methanol-based and (b) ethanol-based electrolytes significantly improve cycling (plating/stripping) Coulombic efficiency (CE, >99.5%) for Zn metal anodes, which is much higher than a (c) widely used aqueous Zn electrolyte (79.2%). These results suggest major enhancements in cycle life and capacity retention are achievable in batteries with alcohol-based electrolytes such as zinc metal battery 100.

Figure 6:
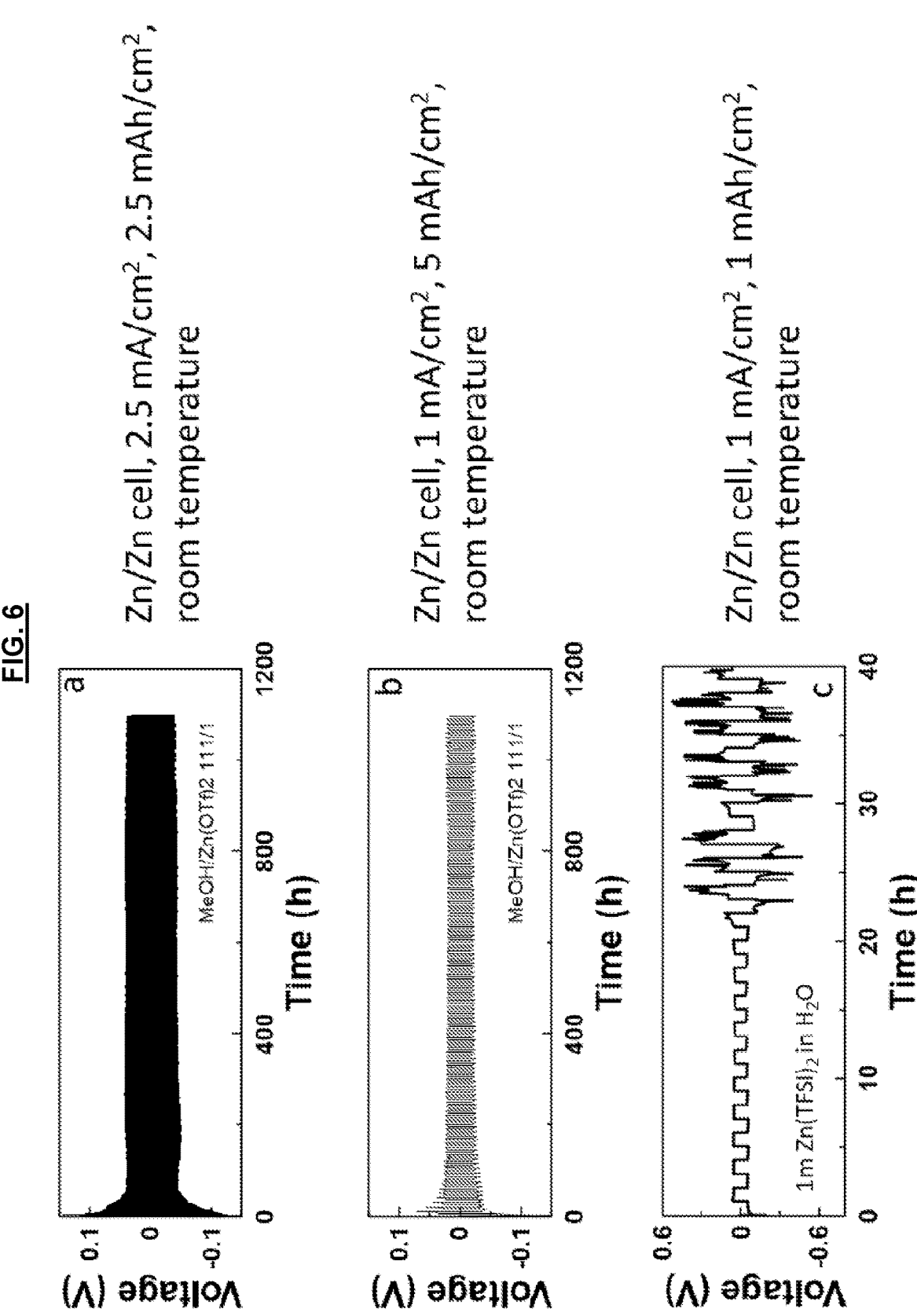
FIG. 6 are graphical diagrams illustrating test results illustrating the effect of methanol on cycle life for a (a) Zn/Zn cell, 2.5 mA/cm$^2$, 2.5 mAh/cm$^2$, at room temperature; (b) Zn/Zn cell, 1 mA/cm$^2$, 5 mAh/cm$^2$, at room temperature; and (c) Zn/Zn cell, 1 mA/cm$^2$, 1 mAh/cm$^2$, at room temperature, according to the embodiments herein.

FIG. 6, with reference to FIGS. 1 through 5, illustrates that, to test the effect of methanol on cycle life, a symmetric Zn/Zn cell shows an extended cycle lifetime (>1000 h) with a realistic areal capacity (5 mAh/cm²) as a goal. To put this in perspective, conventional lithium ion batteries have areal capacities around 3-4 mAh/cm², so these are aggressive performance targets. Voltage polarization is also quite small (<0.05V) according to the test results. In contrast, a conventional aqueous Zn electrolyte can only be cycled for ~20 h at 1 mA/cm², 1 mAh/cm². Accordingly, the embodiments herein achieve improved and surprising results compared to the conventional techniques. Indeed, the degree of improvement over an aqueous baseline is significant.

Figure 7:
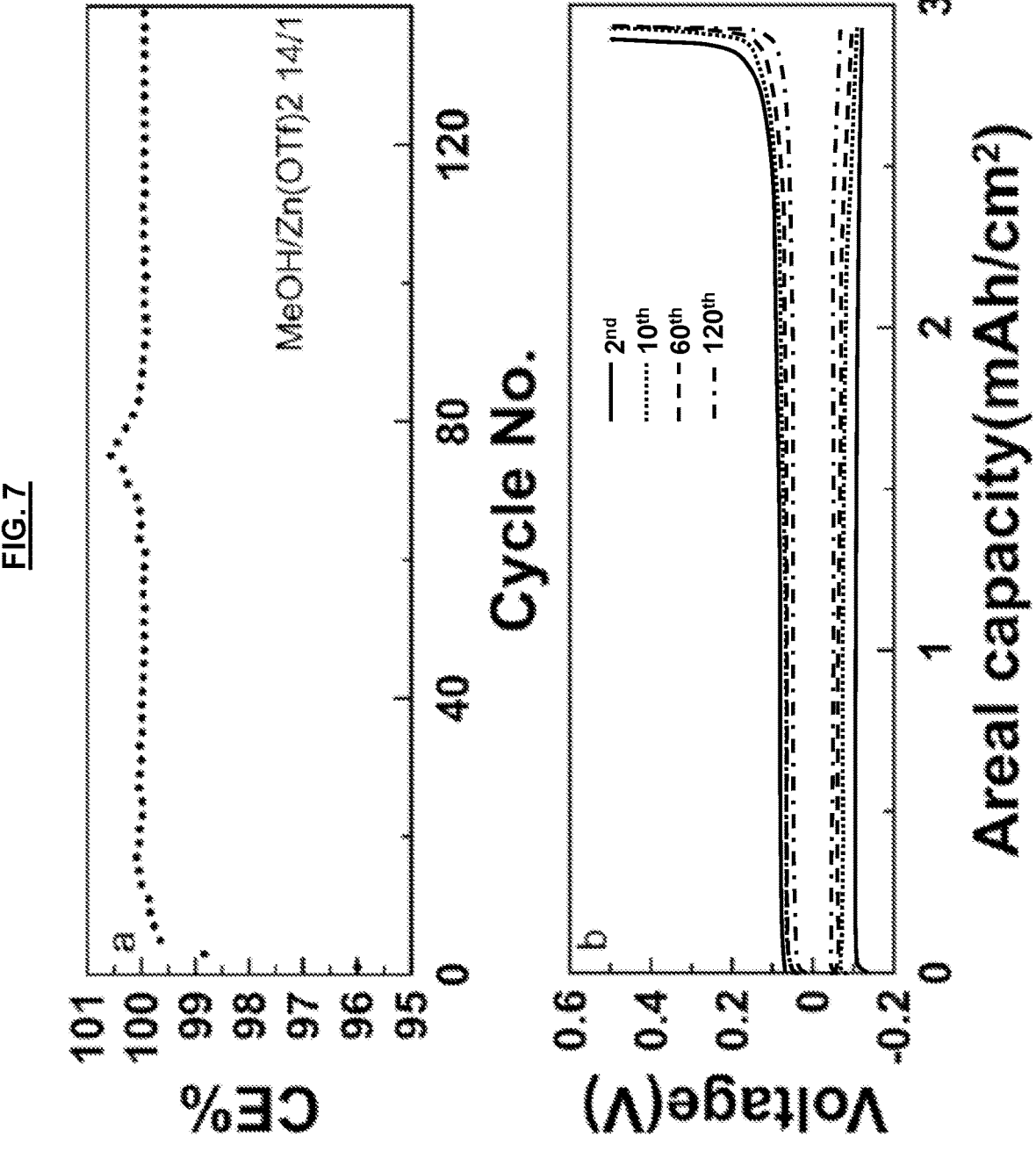
FIG. 7 are graphical diagrams illustrating the (a) CE % and (b) voltage polarization for a Cu/Zn (10 μm) cell, 2.92 mA/cm$^2$, 2.92 mA/cm$^2$, 50% depth of discharge (DOD), room temperature, according to the embodiments herein.

FIG. 7, with reference to FIGS. 1 through 6, illustrates that an extremely high CE of >99.5% is still achieved with a Cu/Zn (10 mm) cell setup at room temperature with a testing condition towards a goal of 2.92 mA/cm², 2.92 mAh/cm², 50% depth of discharge per cycle. Voltage polarization is also demonstrated to be quite small (<0.15V) during cycling. Again, the embodiments herein achieve improved performance under aggressive electrochemical conditions compared to the conventional techniques and materials, as the experimental cycling condition achieves 50% Zn utilization per cycle.

Figure 8:
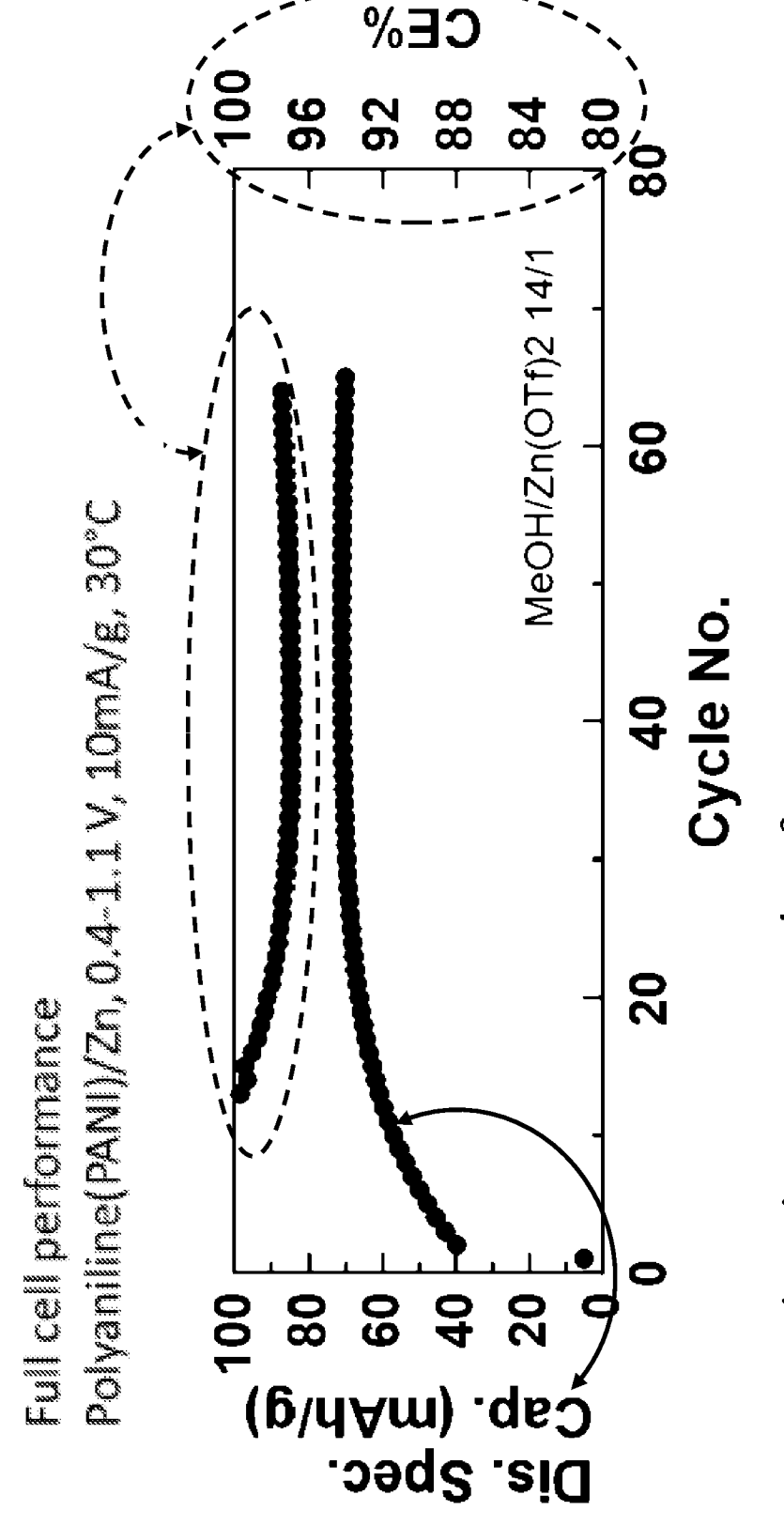
FIG. 8 is a graphical diagram illustrating experimental full cell performance for a methanol-based electrolyte, according to the embodiments herein.

FIG. 8, with reference to FIGS. 1 through 7, illustrates that coupled with polyaniline (PANT) as cathode material, the capability on supporting full cell cycling of methanol-based electrolyte is demonstrated at 30° C. The results demonstrated in FIGS. 5-8 suggest major improvements in efficiency (>99.5%), areal capacity (5 mAh/cm²), and depth of discharge per cycle (50%) compared to some conventional systems, suggesting a significant step toward the advancement of the inventive technology as demonstrated by the test results of the electrochemical cell 10 and zinc metal battery 100 provided by the embodiments herein.

The embodiments herein provide for the use of alcohols (e.g., methanol, ethanol, etc.) as the solvent in electrolytes for rechargeable zinc metal batteries. These alcohol-based electrolytes show utility in improving Zn cycling efficiency and stability as compared to other conventional solvents. This performance is specifically related to the —OH functional group on these molecules and its resulting interphase chemistry rather than a specific alcohol structure such as methanol, suggesting that the entire family of alcohol solvents and polyols may support high performance and offer unique properties.

Batteries are common on the battlefield, but the Zn chemistry provides a safer, sustainable alternative to conventional lithium ion batteries. Zn metal is not as competitive as lithium metal in terms of energy/weight, but provides roughly double the energy per volume of lithium metal cells (taking Zn as an example here), suggesting size-dependent energy storage applications could greatly benefit from a rechargeable Zn metal battery chemistry. Low temperature operation (−20° C.) is another potential benefit of the embodiments herein. The Zn chemistry is currently limited to primary (non-rechargeable) systems, limiting its application. Thus, the techniques provided by the embodiments herein significantly enlarge the scope of application which may benefit from utilizing the embodiments herein. Zn-air cells are common in hearing aids and Ag—Zn batteries are used in medical devices. If basic issues of Zn metal anode can be addressed (such as the issues described above), these Zn chemistry batteries could compete with lithium ion batteries in applications such as grid storage, mobile electronic devices, and electric vehicles offering tremendous market potential, particularly as the materials/device demand for Li-based energy storage skyrockets. Furthermore, the alcohol-based electrolytes provided in accordance with the embodiments herein can improve the performance in other rechargeable MV metal battery chemistries (i.e., Ca, Mg, or Al).

Rechargeable Zinc metal batteries (RZMB) offer a promising, sustainable alternative to lithium ion and lithium metal anode materials for advanced rechargeable batteries with high energy density and safety; however, low cycling efficiency, dendrite formation/growth and undesired reactions between the Zn metal anode and the electrolyte currently weaken prospects of commercializing the technology. Accordingly, the embodiments herein provide alcohol-based electrolytes for energy dense, RZMBs with high efficiency. The experimental test results demonstrated above suggest that the use of alcohol-based electrolytes can support significant improvements in cycling efficiency (>99.5%) and areal capacity (5 mAh/cm², >80% compared to SoA), leading to greatly extended cycle life and improved energy density of full cells due to a reduced anode loading requirement. These results are due to the favorable interactions between the Zn metal surface and hydroxy groups in the alcohol-based molecule, which help suppress parasitic reactions and prevent dendrite growth. The use of widely available alcohols in electrolytes is environmentally friendly and cheaper than many alternative battery solvents.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An electrochemical cell comprising:
  a negative electrode comprising an electrode active material that reversibly plates and strips multivalent cations;
  a positive electrode comprising (i) an electrode active material that reversibly intercalates and de-intercalates cations or anions, or (ii) an inert host that reversibly catalyzes an external reactant;
  a separator between the negative electrode and the positive electrode; and
  non-aqueous electrolyte comprising one or more alcohol-based solvents, with one or more non-alkali metal salts, wherein a total mass of the alcohol-based solvents comprises more than 20% of a total mass of the electrolyte, wherein the one or more alcohol-based solvents (comprising at least one hydroxyl (OH) group) comprise methanol, ethanol, isopropanol, triglycerol, 2,2,2-trifluoroethanol, or a combination thereof, wherein the one or more non-alkali metal salts are dissolved in a concentration range between 0.1M to 4M.

2. The electrochemical cell of claim 1, comprising a mixture of multiple alcohol-based solvents.

3. The electrochemical cell of claim 1, comprising one or more electrolyte additives comprising a concentration range between 0.01% to 20% by weight of the electrolyte.

4. The electrochemical cell of claim 1, wherein the one or more salts comprise a zinc salt, wherein the zinc salt comprises any of a zinc cation and an inorganic or organic anion.

5. The electrochemical cell of claim 1, wherein the zinc salt comprises zinc trifluoromethanesulfonate, zinc bis(trifluoromethane) sulfonimide, zinc chloride, zinc sulfate, zinc nitrate, zinc bromide, zinc fluoride, zinc perchlorate or zinc acetate, or a combination thereof.

6. The electrochemical cell of claim 1, wherein the cations comprise any of $Zn2+$, $Mg2+$, $Ca2+$, $H+$, and $Al3+$.

7. The electrochemical cell of claim 1, wherein the anions comprise any of trifluoromethanesulfonate (OTF—), bis (trifluoromethane) sulfonamide (TFSI—), chloride (Cl—), sulfate (SO42-), nitrate (NO3-), bromide (Br—), fluoride (F—), perchlorate (ClO4-), and acetate (C2H3O2-).

8. A zinc metal battery comprising:
  a negative electrode comprising a metal or metal alloy that reversibly plates and strips cations, wherein the cations comprise any of $Zn2+$, $Mg2+$, $Ca2+$, $Al3+$;
  a positive electrode comprising an electrode active material that reversibly intercalates or de-intercalates cations or anions, wherein the cations comprise any of $Zn2+$, $Mg2+$, $Ca2+$, $Al3+$, and $H+$, and wherein the anions comprise any of trifluoromethanesulfonate (OTF—), bis(trifluoromethane) sulfonamide (TFSI—), chloride (Cl—), sulfate (SO42-), nitrate (NO3-), bromide (Br—), fluoride (F—), perchlorate (ClO4-), and acetate (C2H3O2-);
  a separator between the negative electrode and the positive electrode; and
  a non-aqueous electrolyte comprising one or more alcohol-based solvents, with one or more zinc salts over a concentration range between 0.1M to 4M, wherein a total mass of the alcohol-based solvents comprises more than 20% of a total mass of the electrolyte.

9. The zinc metal battery of claim 8, wherein the one or more alcohol-based solvents comprise methanol, ethanol, isopropanol, triglycerol, 2,2,2-trifluoroethanol, or a combination thereof.

10. The zinc metal battery of claim 8, wherein the one or more zinc salts comprises any of zinc trifluoromethanesulfonate, zinc bis(trifluoromethane) sulfonimide, zinc chloride, zinc sulfate, zinc nitrate, zinc bromide, zinc fluoride, zinc perchlorate, and zinc acetate.

11. The zinc metal battery of claim 8, comprising one or more electrolyte additives comprising a concentration range between 0.01% to 20% by weight of the electrolyte.

* * * * *